United States Patent Office 3,563,957
Patented Feb. 16, 1971

3,563,957
ETHYLENEUREA-TERMINATED POLYURE-
THANE PREPOLYMERS AND CURED
PRODUCTS THEREOF
George W. Beebe, Roseville, Minn., assignor to Minnesota Mining and Manufacturing Company, St. Paul, Minn., a corporation of Delaware
No Drawing. Filed Oct. 3, 1968, Ser. No. 764,943
Int. Cl. C08g 22/04
U.S. Cl. 260—77.5                                24 Claims

ABSTRACT OF THE DISCLOSURE

Isocyanate-terminated polyurethane prepolymers, such as those based on poly(oxypropylene) triols, are reacted with certain active hydrogen-containing ethylene urea derivatives, such as N-hydroxyalkyl or N-aminoalkyl derivatives, to produce corresponding ethyleneurea-terminated prepolymers, which can be crosslinked, for example, with latent crosslinking agents, such as bis(alkoxyalkyl)ethyleneurea, and an acid catalyst to provide cured or crosslinked polyurethane-like materials useful as coatings and adhesives.

FIELD OF INVENTION

This invention relates to polyurethane prepolymers terminated with reactive groups and to a method for their preparation. In another aspect it relates to cured or crosslinked materials made from such prepolymers, and to methods for curing or crosslinking such prepolymers.

BACKGROUND OF THE PRIOR ART

The reaction of poly-functional alcohols, and other compounds having a plurality of active hydrogen atoms, with an excess of polyisocyanate to form liquid or low-melting urethane products (called "prepolymers") of moderate molecular weight with terminal isocyanate groups (—NCO) susceptible to crosslinking reaction with active hydrogen-containing compounds, is well-known in the art. The reaction between the terminal —NCO groups and the crosslinking agent is generally a very fast reaction and it is common practice to keep these reactants separate and use them in the form of a two-component system. Even so, problems are often encountered in the storing and handling of the NCO-terminated prepolymer because the NCO groups usually readily react with any water or moisture present, leading to undesirable side reactions. Consequently, great care must be exercised to use carefully dried containers to avoid exposure of the prepolymer to atmospheric moisture and to use dry reactants, solvents, and fillers if urea and gaseous by-product formations are to be avoided. This problem of the sensitivity of the prepolymer to water or moisture, or other compounds containing active hydrogen atoms, has been overcome to some extent by reacting the free —NCO groups with a blocking agent, such as phenol. When it is later desired to take advantage of the ordinary reactive nature of the isocyanate group, the blocked isocyanate group is regenerated by the prolonged application of heat, for example, at 150 to 200° C., making it available for reaction with moisture and/or crosslinking agents containing active hydrogen atoms. This solution to the problem of sensitivity of the free —NCO groups has some economic disadvantages in requiring such high temperatures. Other disadvantages of this technique are often incurred due to the volatility of the blocking agent and its competition with the crosslinking agent for reaction with the —NCO groups. These problems or disadvantages are overcome in the practice of this invention.

By way of further background, mention should be made of U.S. Patent No. 2,801,230 which discloses the preparation of polymeric thermoplastic cyclic reaction products by reacting polyisocyanate compounds with N,N'-ethyleneurea. U.S. Patent No. 3,365,426 discloses reacting N-hydroxyalkyl-N,N'-ethyleneurea with polyisocyanate compounds to produce resinous polyamide carbamate products. U.S. Patent No. 3,021,306, which discloses curing isocyanate-terminated prepolymers with dimethylolethyleneurea in the presence of quinolinium tetrachlorozincate. As will be apparent hereafter from the detailed description of this invention, the ethyleneurea derivatives of this invention and/or their use are significantly different than that disclosed by these patents.

BRIEF SUMMARY OF THE INVENTION

Briefly, isocyanate-terminated polyurethane prepolymers are reacted with at least an equivalent amount of ethyleneurea derivative having an N-substituent with a remote functional group containing an active hydrogen atom capable of reacting with the free —NCO groups of the prepolymer. By "remote," I mean that the functional group must be separated by at least 2 carbon atoms from the N atom of the ethyleneurea derivative. The resulting ethyleneurea capped or terminated prepolymer is stable at room temperature and in the presence of water or moisture. This capped prepolymer can then be cured, without the necessity of regenerating the —NCO group, by reacting it with a crosslinking agent capable of reacting with the less reactive hydrogen atom directly attached to the other ring N atom of the ethyleneurea derivative. In a preferred and further aspect of this invention, the ethyleneurea terminated prepolymer is reacted with a crosslinking agent derived under acidic conditions from a latent crosslinking material, such as bis(alkoxyalkyl) ethyleneurea. Said acidic conditions can be generated in situ from non-acidic precursors (latent acid catalysts) which are activated to the acidic state by heat, light, etc.

DETAILED DESCRIPTION OF THE INVENTION

The N-substituted ethyleneurea compounds used to cap the isocyanate-terminated prepolymers, in accordance with this invention, preferably have the general formula:

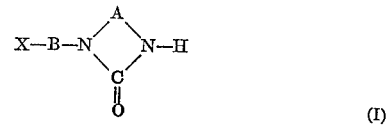

(I)

where A is an alkylene group having 2 to 3 carbon atoms, at least two of which extend in a chain between the adjoined nitrogen atoms, B is a divalent hydrocarbyl group such as an alkylene, arylene, alkarylene, etc. having at least two carbon atoms which extend in a chain between X and the substituted ring N atoms, and X is a functional group having at least one active hydrogen atom, such as hydroxyl, amino, or mercapto. The nature of divalent hydrocarbyl group B is immaterial and it can have substituents, such as halogens, or ester or ether groups, etc., so long as such substituents are nonreactive with —NCO; the purpose of B is to keep X "remote" from the substituted ring N atom. The hydrogen atom attached to the other ring N atom is relatively less reactive with —NCO and will not preferentially react therewith in competition with the active hydrogen atom of said functional group X. The preferred ethyleneurea derivatives are those where A is —C$_2$H$_4$—,

and —CH$_2$CH(CH$_3$)—, B is an alkylene with 2 to 18 carbon atoms of which at least two extend in a chain between the N and X, and X is an amino or hydroxyl group. Ethyleneurea derivatives of this type and their preparation are known in the art, and reference is called to U.S.

Patent Nos. 2,881,171, and 2,887,485, and 3,248,399, which patents are incorporated herein by reference for that purpose.

In reacting the —NCO-terminated prepolymers with the ethyleneurea derivatives an equivalent amount of the latter is reacted with the prepolymer in order to insure the complete destruction of the free —NCO group. Where X in the ethyleneurea derivative formula I is a hydroxyl group, —OH, it reacts with the —NCO group of the prepolymer to form a carbamate linkage, —OC(O)NH—; where X is an amino group, —N(R)H (where R is hydrogen or a lower alkyl with 1–8 carbon atoms) a substituted urea linkage is formed —NRC(O)NH—; where X is a mercapto group, a thiocarbamate linkage is formed, —SC(O)NH—. This reaction is carried out under anhydrous conditions in an inert organic liquid solvent, such as chloroform. The reaction is exothermic and is generally carried out at temperatures of 0° to 100° C., preferably 25° to 50° C. The use of a solvent permits control of the reaction, the refluxing solvent controlling the exotherm of the —NCO reaction. Following the reaction, the reaction mixture is cooled and the desired capped prepolymer is recovered. The reaction mixture may be filtered to remove solids (such as low molecular weight addition products that may form if the correct equivalent amounts of polyol and isocyanate are not used in the preparation of the prepolymer), and the solvent can be removed, if desired, by stripping, for example under vacuum. Any solvent can be used, provided it is inert with respect to —NCO, and the prepolymer and capped product thereof are soluble therein. Those solvents with low volatility are preferred since such solvents can be readily removed from the reaction product. The amount of solvent to be used will vary and be dependent on the exotherm of the reaction and the solubilities of the prepolymer and capped product. The lower the equivalent weight of the prepolymer, the higher will be the exotherm, and the greater the amount of solvent required. Generally, the solvent will be 10 to 200 weight percent or more, based on the weight of the prepolymer.

The isocyanate-terminated polyurethane prepolymer used in this invention is well-known in the art. Generally, it is prepared by reacting a poly-functional material containing active hydrogen with an organic polyisocyanate, optionally in the presence of a catalyst, such as lead octoate. The prepolymers that are preferred in this invention are prepolymers of polyols with hydroxyl functionality of 2 to 6, such as those based on poly(oxypropylene) triols, with molecular weights in the range of 400 to 4,000, polyols of this type being commercially available, such as Niax Diol, Niax Triol LG, Niax Triol LHT, Pluracol GP, Pluracol P, Pluracol TP, Pluracol TPE, Voranol P, Voranol CP, Poly–G, PPG, Actol 21–56, Actol 31–56, Fomrez ED, and Fomrez ET.

Other poly-functional active hydrogen-containing materials that can be used to prepare the polyurethane prepolymers used in this invention include those described in U.S. Patent Nos. 3,317,463 and 3,330,782.

The term "active hydrogen" is well-known and commonly used in the art, and as used herein means active hydrogen as measured and determined by the method described by Zerewitinoff, J. Am. Chem. Soc., 49 3181 (1927).

The polyisocyanates which can be used are also old materials, these generally being aliphatic diisocyanate and aromatic diisocyanate, and reference is made to the latter mentioned patents for a description and list of these polyisocyanates. In this invention, aromatic diisocyanates, such as tolylene diisocyanates, are preferred.

It is also within the scope of this invention to first react the isocyanate-terminated prepolymers with so-called chain-extending agents containing active hydrogen atoms, particularly di-functional agents, such as glycols, diamines, or amino alcohol, in order to get a higher molecular weight polymer. Chain extension of pre-polymers is also well-known in the art. Typical chain-extending agents useful for this purpose include ethylene glycol, hexamethylene glycol, diethylene glycol, and the like. Following chain extension, the main-extended prepolymer with free —NCO groups is then reacted with the substituted ethyleneureas as described above. Before such reaction, it is preferred to further react the chain-extended prepolymer with more isocyanate to ensure the pressure of free —NCO groups on the prepolymer.

The ethyleneurea-terminated prepolymers of this invention will vary from solids having melting points of about 100° C. to viscous liquids. Their ethyleneurea terminal functionality will vary from 2 to 6 (nominal) and their equivalent weights (ethyleneurea) will vary from 420 to 2029. Molecular weight will vary from 1335 to 4620.

The reaction of the isocyanate-terminated polyurethane prepolymer with the ethyleneurea derivative can be illustrated as follows:

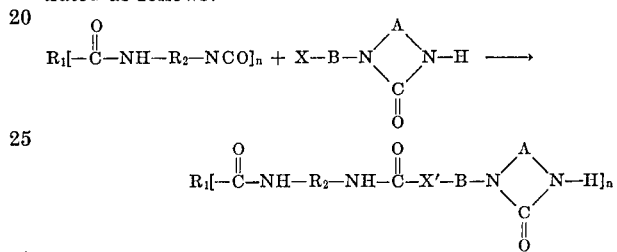

where $R_1$ is the polyvalent organic moiety or residue of an organic compound (e.g., a polyol) having a plurality ($n$) of active hydrogen atoms but devoid of such hydrogen atoms, such as a polyol, $R_2$ is the divalent aliphatic, aromatic, or alkaromatic backbone or residue of the diisocyanate reacted with the active hydrogen-containing compound, A, B, and X are as defined above, and X' is like X but devoid of its active hydrogen atom (i.e. X' is —O—, —N(R)—, or —S—).

The ethyleneurea-terminated prepolymers are preferably crosslinked with latent crosslinking agents which, when activated with acid, generate cations capable of displacing the hydrogen atoms attached to ring N atoms of the terminal ethyleneurea groups of the capped prepolymers and subsequently becoming attached to the ethyleneurea ring. These crosslinking agents preferably have the general formula

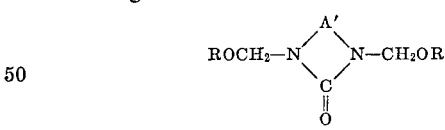

where R is an alkyl having 1 to 18 carbon atoms, preferably 1 to 4 carbon atoms, and A' is as defined for A in Formula I above. R can have substituents, such as halogen, or be interrupted with ethereal oxygen atoms, as long as such substituents are non-reactive with —NCO. Within this class, those of the following formula are especially preferred:

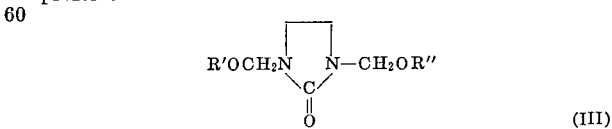

(III)

where R' and R" are methyl because of the ease of preparation of such compounds and their rapid reaction, when activated with acid, with the terminal ethyleneurea groups of the prepolymer. R' and R" can also be alkoxyalkyl, such as $CH_3OCH_2CH_2$— or $C_4C_9OCH_2CH_2$—, such compounds having comparable reactivity and producing R'OH or R"OH alcohols as by-products which are less volatile (which is important in heat-activated systems).

Generally, the amount of crosslinker used will be sufficient to give a ratio of equivalent weight of crosslinker to equivalent weight of ethyleneurea-terminated prepolymer of 0.5/1, to 1.5/1, preferably about 1/1. The crosslinker is preferably dissolved in the ethyleneurea-terminated prepolymer and the admixture mixed with acid catalyst, where the acid catalyst used is a free acid, curing immediately takes place. Where a latent acid catalyst is used, the admixture can be molded or applied to a substrate and then activated by appropriate means, e.g., heat, light, etc. depending upon the particular latent catalyst used.

The crosslinking reaction can be illustrated as follows:

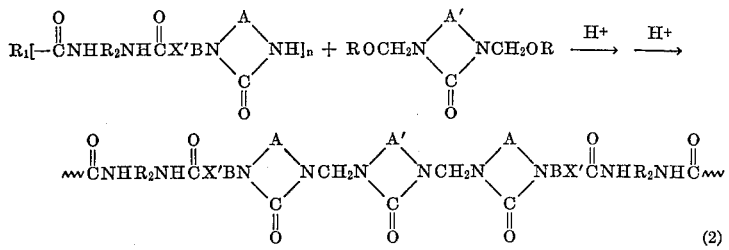

where $R_1$, $R_2$, R, A, A', B, and X' are as defined above, and the wavy line (⌇) represents, in the interest of brevity, the balance of the ethyleneurea-terminated prepolymer formed as shown by Reaction 2.

Representative free acids which can be used to convert the crosslinking agent to a cation include any acid having an dissociation constant less than 1, such as mineral acids, e.g., hydrochloric acid, phosphoric acid, sulfuric acid, aromatic sulfonic acids, perfluorocarboxylic acids, and the like. This requirement of $pK_a<1$ is for rapid curing at room temperature when the crosslinking agent is activated by addition of a free acid. However, weaker acids having $pK_a$ values of 1 to 4 can be used if slower cure and/or curing at elevated temperatures is desired. (This elevated temperature is distinct from that used when heat activated latent acid catalysts are used in that it is sufficiently high to accelerate the rate of crosslinking and not for generation of acid catalyst species.)

Where free acid addition is used to activate the crosslinking agent, generally from 0.1 to 10 weight percent, preferably 1 to 3 weight percent, based on the weight of the ethyleneurea-terminated prepolymer, will be sufficient, the rate of cure being dependent on the amount of free acid used.

Activation of the crosslinking agent with free acid results in a very rapid crosslinking reaction which is difficult to control. Therefore, I prefer to use a latent acid catalyst, i.e., a material which is normally non-acidic or non-catalytic, but becomes active or catalytic when activated by suitable means, e.g., heat, light, etc. Use of a latent acid catalyst (added as such or in a suitable solvent), provides for extended work or pot life (i.e., latency) and, after coating, molding, or bonding application of the system, is then activated to effect cure.

Where heat is used to activate, an especially useful class of latent acid catalyst are the substituted benzaldoxime tosylates of the formula:

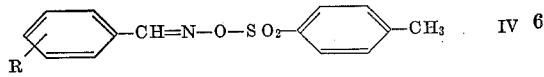

where R is hydrogen, a lower alkyl, such as methyl, para-$NO_2$, para-chloro, or 2,4-dichloro. Another useful class of heat-activated latent acid catalysts are the amine salts of para-toluene sulfonic acid, especially the morpholine salt. Other heat-activated catalyst which can be used are the amine hydrochlorides salts, sulfate salts of brucine, poly - alpha - chloroacrylonitrile, dichlorosuccinic acid, quinolinic acid, and phenyl mercuric acetate. The heat or thermally activated catalysts can generally be used at 50° to 200° C., preferably at 100° to 150° C., the particular temperature used depending on the particular catalyst used and cure rate desired, the cure rate also depending on the amount of latent catalysts used.

Light-activated latent acid catalyst can also be used to activate the crosslinking agents. Examples of such latent catalysts are halogenated hydrocarbons, such as $CBr_4$, $CHI_3$, $C_2H_2Br_4$, $C_2H_2Cl_4$, $C_2BR_6$, hexabromocyclohexane, phenethyl chloride or bromide, chloroform, and tetrabromo-o-xylene, tribromoquinaldine, and 1,5-dihydroxy-2,2,4,4-tetrachloropentan-2-one, etc.

The wavelength of light used to activate these latent catalysts will depend upon the particular latent catalyst used. Sensitizers can be used in combination with such catalysts, the sensitizers being compounds which absorb light of longer wavelengths and transfer this energy to the latent catalysts. Thus, curing can be effected at wavelengths other than that absorbed by the latent catalyst.

Another group of latent catalysts which can be used are those activated by hydrolytic activation, such as antimony trichloride, bismuth trichloride, bismuth tribromide, toluene, sulfonyl chloride, perfluoroacetic anhydride, and the like, which in the presence of moisture or water yield acids.

Still another means of effecting the activation of the crosslinker is to use free isocyanate compounds in combination with the amine salts of acids, the free NCO compounds reacting with the salts at ambient or elevated temperatures to yield free acid and urea, the free acid activating the crosslinker to convert it to the cation. Alternatively, the NCO compound can be used in a latent form and subsequently activated by heat, the liberated NCO compound then reacting with the salt to produce the free acid catalyst.

The compositions of this invention can be used in areas where presently standard polyurethanes are used, such as coatings for wood, concrete, metal, and electrical applications, adhesives for bonding metal to metal, rubber to metal, fabric to rubber, and wood to wood, fibers for the textile manufacture, and flexible and rigid foams, such as used in fabricating refrigeration insulation, structural materials for housing, void fillers, furniture, packaging, toys, etc. The advantages of these compositions and in their preparation over the prior art polyurethanes, and the versatility of curing conditions and variations in pre- and post-cure properties, are combined with their relatively low cost.

EXAMPLES

The objects and advantages of this invention are further illustrated by the following examples, but it should be understood that the various materials and amounts thereof used in these examples, as well as conditions of reaction and other details, should not be construed to unduly limit this invention.

Example 1

A poly(oxypropylene) triol (Pluracol TPE 4542), having an hydroxyl equivalent weight of 1380, was dried by heating under vacuum of <1 mm. for 3 hrs. at 160° C. In a flask fitted with stirrer, thermometer, nitrogen inlet and outlet protected by a drying tube, was placed 296.6 g. of the cooled dried triol. The air was replaced with nitrogen and a nitrogen atmosphere maintained throughout the reaction. With rapid stirring, 46.9 g. of 2,4-tolylene diisocyanate was added as a single portion. A slight exotherm developed which was controlled to <40° C. by means of an ice-water bath. After the exotherm had abated (approximately ½ hr.), the mixture was gradually heated to 90° C. and maintained with stirring for 1½ hr. Cooling to ambient temperature gave an isocyanate-terminated polyurethane prepolymer which had an isocyanate content of 1.01 milliequivalents of NCO/g. prepolymer.

In a flask fitted with thermometer, stirrer, nitrogen inlet, condenser and drying tube, was placed 341 g. of the above isocyanate-terminated prepolymer. Chloroform (1190 g.) was added and the mixture stirred under nitrogen to obtain a homogeneous solution. With rapid stirring, a solution of 44.2 g. (.342 mole) 1-(β-aminoethyl)-2-imidazolidone in 149 g. chloroform was added as a single portion. The exotherm which developed was controlled to 40° C. with external cooling. After the exotherm had abated, the mixture was heated to reflux for 4 hrs. The mixture was allowed to stand and cool overnight and then filtered to remove a small amount of while solid. The filtrate was evaporated on a rotary evaporator (80–90° C./1 mm.) to yield 287.7 g. (84.3% of theory based on total solids charge) of light yellow, extremely viscous liquid. Analysis by infrared indicated the product was the desired ethyleneurea-terminated prepolymer. Calculations based on the experimentally determined isocyanate equivalent weight gave ethyleneurea NH equivalent weight of 0.892 meq./g.

Example 2

A poly(oxypropylene) triol (Pluracol GP 3030), with a hydroxy equivalent weight of 1009 was dried as in Example 1, and 759.5 g. of the dried triol was placed in a 5 liter flask fitted with a stirrer, nitrogen inlet, thermometer, and condenser with drying tube. Using the same procedure as Example 1, 143.5 g. (1.65 equiv.) of 2,4-tolylene diisocyanate was added. Determination of the residual isocyanate content of the isocyanate-terminated prepolymer after reaction was complete gave an NCO equivalent weight of 1122.

The isocyanate intermediate (835 g., 0.774 equiv.) was diluted with 2 liters of methylene chloride as in Example 1, and 95.97 g. of 1-(β-aminoethyl)-2-imidazolidone in 200 ml. of methylene chloride was added. After reaction and isolation, as Example 1 (filtration was not necessary), 881 g. (94.7% of theory) of ethyleneurea-terminated prepolymer was obtained which had a calculated ethyleneurea NH equivalent weight of 1251. The material was a clear, slightly-colored, viscous liquid.

Example 3

An isocyanate-terminated prepolymer was prepared as in Example 2 from 201.8 g. of poly(oxypropylene) triol (Pluracol GP 3030), E. W. 1009, and 38.3 g. 2,4-tolylene diisocyanate The only difference was the addition of a few drops of lead octoate solution to serve as a catalyst for the hydroxyl-isocyanate reaction. The intermediate prepolymer had an isocyanate equivalent weight of 1106. This intermediate (227.1 g. 0.205 equiv.) was diluted wtih 100 ml. of methylene chloride, and 26.65 g. of 1-(β-hydroxyethyl)-2-imidazolidone dissolved in 125 ml. of methylene chloride was added dropwise with stirring. The exotherm which developed was controlled to 33° C. by the rate of addition. The mixture was then refluxed for 2 hrs. After standing overnight at ambient temperature, the solvent was removed on a rotary evaporator at 70° C./0.1 mm. The ethyleneurea-terminated prepolymer was a cloudy viscous liquid and amounted to 248.3 g.

Using essentially the methods as outlined in Examples 1, 2, and 3, ethyleneurea-terminated prepolymers were prepared from poly(oxypropylene) polyols having molecular weights ranging from 400 to 5000 and hydroxyl functionality ranging from 2 to 6. The ethyleneurea equivalent weights of these materials ranged from 420 to 2029. The materials with low equivalent weight and high functionality were solids while higher equivalent weight materials with lower functionality were very viscous liquids.

Example 4

A mixture of 5.0 g. of the ethyleneurea-terminated prepolymer prepared in Example 1 (0.892 meq. ethyleneurea/g.) and 0.37 g. 1,3-bis(methoxymethyl)-2-imidazolidone were mixed with slight warming. The cooled mixture showed no tendency to cure for at least 9 months. Other samples of the ethyleneurea-terminated prepolymer prepared as above to which 15 drops of a solution of 30 g. p-toluenesulfonic acid in monoglyme to make 100 ml. were added, underwent an immediate gelation and were completely cured in 1–2 hrs. at room temperature.

Example 5

To 10 ml. of a stock cure solution prepared by dissolving 40 g. of the trifunctional ethyleneurea terminated prepolymer prepared in Example 3 (ethyleneurea equivalent weight 993), and 3.14 g. 1,3-bis(methoxymethyl)-2-imidazolidone in 200 ml. of chloroform, was added 0.04 g. of the p-tosylate ester of p-methoxybenzaloxime. The 10 ml. portions of solution contained 1.97 meq. of ethyleneurea terminated prepolymer and a ratio of methoxymethyl to ethyleneurea of 0.91. Samples of this solution were cast on glass plates and the solvent allowed to evaporate. Oven curing of samples at 110° C. for 3 min. or longer led to tack-free clear crosslinked films. Curing at 50° C. gave the same results in approximately 1½ hrs. At ambient temperatures cure was attained in 2 days. A sample stored at 0° C. for 2 days was still tacky and showed no apparent cure; subsequent curing of this sample at 100° C. for 3 min. gave a tack-free clear, cured film.

Example 6

To 10 ml. of a chloroform solution containing 1.78 meq. of the trifunctional ethyleneurea-terminated prepolymer (E. W. 1120) and 1.69 meq. of 1,3-bis-(methoxymethyl)-2-imidazolidone, was added 0.08 g. of p-chlorobenzaloxime p-tosylate. Samples were coated and cured as shown below.

| Conditions: | Time to cure |
|---|---|
| 100° oven | 3 min.+35 minutes at ambient temperature. |
| Ambient temperature | 6 days. |
| 0° C. in refrigerator | Uncured at 20 days. |

Example 7

A mixture of 10 g. of the trifunctional ethyleneurea-terminated prepolymer prepared in Example 2 (0.892 meq. ethyleneurea/g.), 0.736 g. 1,3-bis(methoxymethyl)-2-imidazolidone, and 3.8 g. (25% by weight) of amorphous silica filler were combined in a Waring Blendor using chloroform as a dispersing medium. The solvent was removed on a slow turn rotary evaporator at high vacuum and 80–90° C. The material was transferred to a small bottle, cooled to 0° C. and a saturated solution of 0.4 g. of p-tosylate of p-methoxybenzaloxime in chloroform was stirred in manually. Storage at 0° C. resulted in a highly viscous mastic which remained workable for at least 2 weeks. A portion of this material at room temperature cured to a tack-free tough rubber overnight. At 50° C. the cure took approximately 1 hr.

The p-tosylate of 3,4-dichlorobenzaloxime was also used as a latent catalyst for curing ethyleneurea-terminated prepolymers in systems similar to above.

Example 8

To 5 ml. of methylene chloride solution containing 1.1 g. of the trifunctional ethyleneurea-terminated prepolymer prepared in Example 3 (E.W. 1174) was added 0.136 g. 1,3-bis(methoxymethyl)-2-imidazolidone as the crosslinker and 0.5 g. morpholinium p-toluenesulfonate as the latent catalyst. Samples were coated at 10 mil wet coat, allowed to air dry 10 min. and the tacky coating cured 5 min. at 120° C. to give a clear, rubbery, crosslinked polymer.

Example 9

To 5 ml. of a methylene chloride solution of 1.0 g. of trifunctional ethyleneurea-terminated prepolymer prepared in Example 3 (E.W. 1174) and 0.077 g. 1,3-bis(methoxymethyl)-2-imidazolidone, was added 0.05 g. of morpholinium p-toluenesulfonate. A portion of the solution was coated on glass and cured at 130° C. for 1–2 min. to give a crosslinked film. Storage for 13 days at ambient temperature caused no observable change in the solution. The sample was placed in an oven at 50° C. and checked periodically for curing or gelation (the $CH_2Cl_2$ solvent was allowed to vaporize out). After 5 days no change was noted; a portion of the sample was smear-coated on glass and cured 5 min. at 120° C. to a tough crosslinked rubber. After a total of 15 days at 50° C., the main sample had cured to a tough rubber.

Example 10

Four solution samples were prepared by dissolving 2.0 g. of trifunctional ethyleneurea-terminated prepolymer (E.W. 1011) prepared in Example 2, and 0.157 g. 1,3-bis(methoxymethyl)-2-imidazolidone in 10 ml. of chloroform. To three of the samples was added 0.1 millimole of tetrabromomethane, iodoform, and tribromoquinaldine, respectively. The fourth sample contained no latent catalyst. Portions of each sample were coated on glass plates and exposed for two 10-min. periods to a 275 watt G.E. Sunlamp at a distance of 10 inches. The three films containing the latent catalysts were cured after this exposure; the uncatalyzed sample was unchanged. The degree of cure was a function of film thickness with a limit of approximately 15 mil for complete cure with this exposure.

Example 11

A solution containing ethyleneurea-terminated prepolymer, crosslinker, and tribromoquinaldine as the latent catalyst was prepared as in Example 10 above and divided into two equal portions. One portion was used as a control and to the other was added 0.083 g. of 7-dimethylamino-4-methylcoumarin. Exposure of cast films of each portion (5 mil wet coat) to a 150 watt flood lamp at 6 inches resulted in no cure on the control after 45 min. exposure while the sample containing the coumarin derivative as a sensitizer cured after 25 min. exposure. Coated samples of both solutions were stable and showed no signs of curing after storage for 18 days in the dark.

Example 12

A solution was prepared from 1.0 g. trifunctional solid ethyleneurea-terminated prepolymer (2.245 meq./g.), prepared in Example 2, 0.196 g. 1,3-bis(methoxymethyl)-2-imidazolidone, 0.04 g. hexabromoethane and 0.002 g. 7-dimethylamino-4-methylcoumarin in 3 ml. of 3:1 ethanol:N-methylpyrrolidone solvent. Coating and overnight drying in the dark resulted in essentially nontacky film. Curing by 2–3 minute exposure to a 275 watt Sunlamp at 6 inches resulted in a crosslinked polymer. This was shown by the differential solubility; before cure, polymer film was readily soluble in N-methylpyrrolidone whereas after exposure the film became insoluble.

Example 13

From 50.0 g. of a trifunctional ethyleneurea-terminated prepolymer (1.155 meq./g.) prepared in Example 2, 5.66 g. 1,3-bis(methoxymethyl)-2-imidazolidone, 3.45 g. hexabromoethane, and 0.15 g. 7-dimethylamino-4-methylcoumarin 250 ml. of solution was prepared using chloroform as a solvent. 1,4-bis(isopropylamino)anthraquinone dye, 0.02 g., was added. Coating of this solution on etched aluminum plates gave a nearly non-tacky coating (approximately 1 mil) which was light blue. Exposure to a 275 watt Sunlamp at 6 inches for 3 min. through a mask caused a color change in the light struck areas from blue to colorless or light pink and also caused crosslinking of the polymer. It was then possible to wash off the blue unexposed film with ethanol leaving the crosslinked film on the plate having the relief image of the original exposure mask.

Example 14

Three identical solutions were prepared by dissolving 4.0 g. of trifunctional ethyleneurea-terminated prepolymer (E.W. 1164) prepared in Example 3, 0.3028 g. 1,3-bis(methoxymethyl)-2-imidazolidone, and 0.1752 g. hexabromoethane in 20 ml. chloroform for each solution. One sample was used as prepared; to the other two was added 0.0016 g. and 0.0072 g. of 7-dimethylamino-4-methylcoumarin, respectively. Exposure of coated films (5–10 mil wet coat) to a 275 watt Sunlamp at 6 inches for 5 min. caused the system to cure completely on removal from the activating light. Exposure of films for 30 sec. to 1 min. resulted in catalyst activation as evidenced by the subsequent curing of the films after 2 hrs. storage in the dark. Periodic coating and curing under the above conditions of the original solutions which had been stored in the dark over an 8-month period showed no change in the curing conditions. The original solutions remained fluid over the 8-month period with no sign of gelation indicating loss of latency.

Example 15

Using a solution prepared as in Example 14 without added 7-dimethylamino-4-methyl coumarin, it was possible to add various sensitizers to the system which increased the range of activating light into the visible region. Two compounds of particular effectiveness were the following,

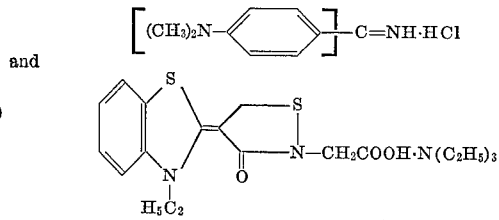

and

A quartz iodide lamp which contains negligible ultraviolet radiation in its spectral distribution was used as an activating light at a distance of 8 inches. It was possible to cure coated films of the above solution which contained one or the other of the noted compounds. The level of incorporation of the compounds was 0.6% by weight based on total solids. Omission of the above sensitizing compounds resulted in coated samples which would not cure under the above light-activating conditions.

Example 16

Ethyleneurea (51.6 g., 0.6 mole) was dissolved in 125 ml. of methyl cellosolve (β-methoxyethanol) with warming to 50° C. Heat was removed and with stirring a solution of 41.6 g. of paraformaldehyde and 0.32 g. of sodium hydroxide in 125 ml. of methyl cellosolve was added at such a rate as to maintain the pot temperature at 50–55° C. The reaction was stirred and maintained at 50° C. for 2 hrs. after addition was complete. The mixture was cooled to 10° C. and 1.6 g. concentrated hydrochloric acid in 8 ml. of methyl Cellosolve was added, causing a 10° C. rise in temperature. The major portion of the solvent was removed on a rotary evaporator and the residue distilled to give 66.9 g. produce, 1,3-bis[β-methoxy)ethoxymethyl]-2-imidazolidone.

In a like manner 1,3-bis[β-(n-butoxy)ethoxymethyl]-2-imidazolidone was prepared.

A stock solution was prepared by dissolving 6.25 g. of a trifunctional ethyleneurea-terminated prepolymer having an equivalent weight of 1251 prepared as in Example 3, 1.81 g. of the above-prepared crosslinker, 1,3-bis[β-(methoxy)ethoxymethyl] - 2 - imidazolidone, in sufficient methylene chloride to give 25 ml. The equivalent ratio of ethyleneurea-terminated prepolymer to crosslinker was 1:1. To a 5 ml. portion of this stock solution was added 0.06 g. of morpholinium p-toluenesulfonate. This solution was applied to a substrate as a coating (10 mil wet coat), the coating was allowed to air dry, and it was heated at 150° C. for 2 min. to give a cured, void free, non-tacky, rubbery film. A similarly activated 5 ml. portion of stock solution was placed in an aluminum dish and evacuated to remove solvent and entrapped air, then cured 3 min. at 150° C. The thick cured sample contained a few bubbles, probably due to residual solvent, but not the extensive foaming experienced when 1,3-bis(methoxymethyl)-2-imidazolidone is used under these conditions.

A third 5 ml. portion of the stock solution was activated with 0.06 g. of 1,5-dihydroxy-2,2,4,4-tetrachloropentan-2-one and 0.01 g. of Setoflavin T, sensitizer (the heterocyclic compound shown in Example 15). A 10 mil wet coat after drying was exposed to a quartz-iodide visible light source. The material cured by photo activation after 8.8 min. exposure to a rubbery, non-tacky, clear film.

In a like manner, said 1,3-bis[β-(methoxy)ethoxymethyl]-2-imidazolidone can be used allowing curing up to approximately 120° C. without void formation due to by-product alcohol.

Various modifications and alterations of this invention will become apparent to those skilled in the art without departing from the scope and spirit of this invention, and it should be understood that this invention is not to be unduly limited to the illustrative embodiment set forth herein.

I claim:

1. A process comprising reacting an isocyanate-terminated polyurethane prepolymer with at least an equivalent amount of an N-substituted ethyleneurea derivative to produce an ethyleneurea-terminated prepolymer, said N-substituted ethyleneurea derivative having the formula

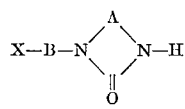

where A is an alkylene having at least 2 carbon atoms extending in a chain between the adjoined nitrogen atoms shown in said formula, B is a divalent hydrocarbyl having at least 2 carbon atoms extending in a chain between X and the nitrogen atom adjoined thereto, and X is a functional group having at least one active hydrogen atom.

2. The process according to claim 1, wherein said N-substituted ethyleneurea derivative is 1-(β-aminoethyl)- or 1-(β-hydroxyethyl)-2-imidazolidone.

3. The process according to claim 1, wherein said isocyanate-terminated prepolymer is the reaction product of (1) poly(oxypropylene) polyol with a hydroxyl functionality of 2 to 6 and an average molecular weight of 400 to 4000, and (2) an organic polyisocyanate.

4. The process according to claim 3, wherein said polyol is poly(oxypropylene) triol and said polyisocyanate is 2,4-tolylene diisocyanate.

5. The process according to claim 4, wherein said N-substituted ethyleneurea derivative is 1-(β-aminoethyl)-2- or 1-(β-hydroxyethyl)-2-imidazolidone.

6. The process according to claim 1, further comprising reacting said ethyleneurea-terminated prepolymer with a crosslinking agent to produce a crosslinked polymer.

7. The process according to claim 6, wherein said crosslinking agent is a compound which under acidic conditions generates cations.

8. The process according to claim 7, wherein said acidic conditions are derived in situ by activating a latent acid catalyst with light, heat, or water, or by adding free acid.

9. The process according to claim 8, wherein said crosslinking agent is bis(alkoxyalkyl)ethyleneurea.

10. The process according to claim 9, wherein said crosslinking agent has the general formula

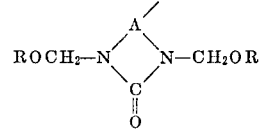

where A′ is an alkylene having at least 2 carbon atoms extending in a chain between the adjoined nitrogen atoms shown in said formula, and R is an alkyl or an alkoxyalkyl.

11. The process according to claim 9, wherein said crosslinking agent is 1,3-bis(methoxymethyl) - 2 - imidazolidone, 1,3-bis(β-methoxyethoxymethyl) - 2 - imidazolidone, or 1,3-bis(β-n-butoxyethoxymethyl) - 2 - imidazolidone.

12. The process according to claim 9, wherein said latent acid catalyst is (1) an acid derived by heating amine salts of acids having $pK_a$ values up to 4 or halogen-containing compounds selected from the group consisting of alpha-chloro- or alpha-bromo-carboxylic acids, polychloro- or polybromo-substituted alkanes, and chloro- or bromo-alkyl substituted aromatics, or (2) an acid derived by light activating said halogen-containing compounds or alpha-chloro- or alpha-bromo-ketones, or (3) an acid derived by moisture activation of perfluorocarboxylic acid anhydrides or chlorides or readily hydrolyzable inorganic chlorides or bromides.

13. A composition comprising the reaction product of an isocyanate-terminated polyurethane prepolymer and at least an equivalent amount of an N-substituted ethyleneurea derivative having the formula

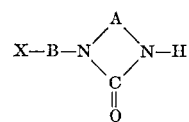

where A is an alkylene having at least 2 carbon atoms extending in a chain between the adjoined nitrogen atoms shown in said formula, B is a divalent hydrocarbyl having at least 2 carbon atoms extending in a chain between X and the nitrogen atom adjoined thereto, and X is a functional group having at least one active hydrogen atom.

14. A composition having the formula

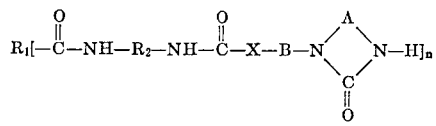

where $R_1$ is the polyvalent organic residue of an organic compound having a plurality of active hydrogen atoms equal to $n$ but devoid of active hydrogen atoms, $R_2$ is the divalent hydrocarbyl residue of an organic diisocyanate, A is an alkylene having at least 2 carbon atoms extending in a chain between the adjoined nitrogen atoms shown in said formula, B is a divalent hydrocarbyl having at least 2 carbon atoms extending in a chain between X and the nitrogen atom adjoined thereto, and X is the residue of a functional group having an active hydrogen atom but devoid of such atom.

15. A composition according to claim 14, wherein said organic compound is poly(oxypropylene) polyol with an average molecular weight of 400 to 4,000, $n$ is an integer of 2 to 6, $R_2$ is a divalent aliphatic, aromatic, or alkaromatic bridge, A and B are —$C_2H_4$—, and X is —O—, —NR— (where R is hydrogen or lower alkyl), or —S—.

16. A composition according to claim 15, wherein said polyol is a triol, and $R_2$ is

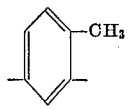

17. A composition comprising the composition of claim 14 in admixture with a crosslinking amount of a crosslinking agent which under acidic conditions generates cations.

18. A composition according to claim 17, wherein said crosslinking agent is a bis(alkoxyalkyl)ethyleneurea.

19. A composition according to claim 17, wherein said crosslinking agent has the general formula

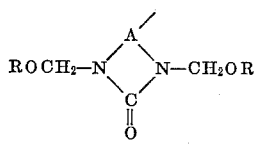

where A is an alkylene having at least 2 carbon atoms extending in a chain between the adjoined nitrogen atoms shown in said formula, and R is an alkyl or an alkoxyalkyl.

20. A composition according to claim 19, wherein said crosslinking agent is 1,3-bis(methoxymethyl)-2-imidazolidone, 1,3-bis(β-methoxyethoxymethyl)-2-imidazolidone, or 1,3-bis(β-n-butoxyethoxymethyl)-2-imidazolidone.

21. A composition according to claim 19, further comprising in admixture a latent acid catalyst which generates said acidic conditions upon being activated by heat or light.

22. A composition according to claim 21, wherein said latent acid catalyst is the p-tosylate ester of p-methoxybenzaloxime or morpholinium-p-toluene sulfonate.

23. A composition comprising a cured polymer having a plurality of polyvalent organic residues of an organic compound having a plurality of active hydrogen atoms and a plurality of units of the general formula

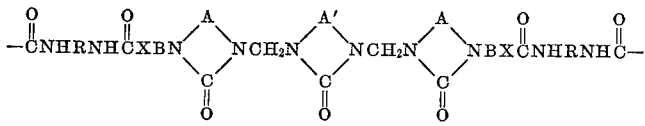

where R is a divalent hydrocarbyl bridge, B is a divalent hydrocarbyl bridge having at least 2 carbon atoms extending in a chain between X and N adjoined thereby, X is a divalent residue of functional group having an active hydrogen atom but devoid of such atom, and A and A' are alkylenes having at least 2 carbon atoms extending in a chain between N atoms adjoined thereby.

24. A composition according to claim 23, wherein said organic compound is poly(oxypropylene) triol with an average molecular weight of 400 to 5,000, R is

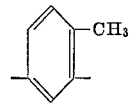

A and A' and B are —$C_2H_4$—, and X is —O— or —NH—.

References Cited
UNITED STATES PATENTS

| | | | |
|---|---|---|---|
| 3,021,306 | 2/1962 | Csendes et al. | 260—67.5 |
| 3,365,426 | 1/1968 | Walles | 260—77.5 |

HOSEA E. TAYLOR, Primary Examiner

M. J. WELSH, Assistant Examiner

U.S. Cl. X.R.

117—121, 124, 132, 148; 156—331; 204—159.11; 260—2.5

UNITED STATES PATENT OFFICE
CERTIFICATE OF CORRECTION

Patent No. 3,563,957                    Dated February 16, 1971

Inventor(s) George W. Beebe

It is certified that error appears in the above-identified patent and that said Letters Patent are hereby corrected as shown below:

Column 4, line 4, "main-extended" should read -- chain-extended --.

line 9, "pressure" should read -- presence --.

Claim 1, the formula should read

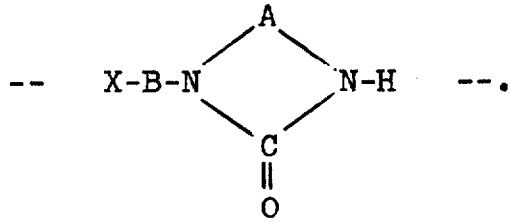

-- X-B-N⟨A/C⟩N-H --.

where C=O

Claim 10, in the general formula, "A" should read -- A' --

Claim 19, in the general formula, "A" should read -- A' -- and the "A" in the first line after the general formula should read -- A' --.

Signed and sealed this 3rd day of August 1971.

(SEAL)
Attest:

EDWARD M. FLETCHER, JR.          WILLIAM E. SCHUYLER, JR.
Attesting Officer                Commissioner of Patents